US010668506B2

(12) United States Patent
Erden et al.

(10) Patent No.: US 10,668,506 B2
(45) Date of Patent: Jun. 2, 2020

(54) SORTING CONVEYOR WITH ARTICLE REMOVAL DEVICE

(71) Applicant: BEUMER Group GmbH & Co. KG, Beckum (DE)

(72) Inventors: Ertan Erden, Holland, PA (US); Pierre Damis, Parlin, NJ (US); Christopher Atwan, Cranford, NJ (US); Maurizio Zanni, Manalapan, NJ (US)

(73) Assignee: BEUMER Group GmbH & Co. KG., Beckhum (DE)

( * ) Notice: Subject to any disclaimer, the term of this patent is extended or adjusted under 35 U.S.C. 154(b) by 58 days.

(21) Appl. No.: 15/961,199

(22) Filed: Apr. 24, 2018

(65) Prior Publication Data
US 2019/0321860 A1 Oct. 24, 2019

(51) Int. Cl.
B07C 3/08 (2006.01)
B07C 5/22 (2006.01)
(Continued)

(52) U.S. Cl.
CPC .............. B07C 3/082 (2013.01); B07C 5/22 (2013.01); B65G 17/32 (2013.01); B65G 47/38 (2013.01); B65G 47/46 (2013.01)

(58) Field of Classification Search
CPC .......... B07C 3/082; B07C 5/22; B65G 17/32; B65G 47/38; B65G 47/46; B65G 3/082; B65G 47/96; B65G 47/82
See application file for complete search history.

(56) References Cited

U.S. PATENT DOCUMENTS 3,791,518 A * 2/1974 Vanderhoof ............ B07C 5/362
209/552
5,388,705 A * 2/1995 Fine ........................ B07C 5/361
198/367

(Continued)

FOREIGN PATENT DOCUMENTS

NL 2015502 4/2017

Primary Examiner — Charles A Fox
Assistant Examiner — Kalyanavenkateshware Kumar
(74) Attorney, Agent, or Firm — Ganz Pollard, LLC

(57) ABSTRACT

A sorting device for sorting articles, comprising a conveyor which is movable in a conveying direction along a conveying path, the conveyor comprising a number of sorting units, each sorting unit comprising a carriage and at least one load-carrying element connected to the carriage for supporting articles, wherein the load-carrying elements are movable with regard to an associated carriage for unloading articles from the load-carrying elements at predetermined unloading positions, at least two of the sorting units being coupled together, a gap being formed between two adjacent load-carrying elements of two sorting units that are coupled together, the gap being covered by an intermediate element adapted to support an article, the sorting device comprising a stationarily arranged removal device for moving a selected article in a transverse direction off the conveyor at a predetermined removal position, wherein the removal device comprises a support element, the support element being movable along a longitudinal direction extending parallel to the conveying path, a first drive means being adapted to move the support element with a speed and in a transversal position corresponding to the selected article, the removal device further comprising a pushing element supported by the support element, a second drive means being adapted to move the pushing element in the transverse direction in order to remove the article from the conveyor.

25 Claims, 4 Drawing Sheets

(51) Int. Cl.
  *B65G 17/32* (2006.01)
  *B65G 47/38* (2006.01)
  *B65G 47/46* (2006.01)

(56) References Cited

U.S. PATENT DOCUMENTS

| | | | | |
|---|---|---|---|---|
| 5,464,088 | A * | 11/1995 | Koerber | B65G 43/08 198/364 |
| 5,489,017 | A * | 2/1996 | Bonnet | B65G 17/345 105/30 |
| 6,076,653 | A * | 6/2000 | Bonnet | B65G 47/53 198/370.09 |
| 6,246,023 | B1 * | 6/2001 | Kugle | B07C 5/36 104/290 |
| 7,080,740 | B2 * | 7/2006 | Uchikura | B07C 5/3412 209/633 |
| 8,833,541 | B2 * | 9/2014 | Aillon | B65G 21/14 198/358 |
| 2003/0015461 | A1 * | 1/2003 | Miyamoto | B07C 5/02 209/577 |
| 2004/0163929 | A1 * | 8/2004 | Mills | B07C 5/363 198/438 |
| 2005/0236306 | A1 * | 10/2005 | Drewes | A24B 1/04 209/644 |
| 2009/0242356 | A1 * | 10/2009 | Layne | B07C 3/08 198/348 |

\* cited by examiner

SORTING CONVEYOR WITH ARTICLE REMOVAL DEVICE

BACKGROUND

This invention refers to a sorting device for sorting articles, comprising a conveyor which is movable in a conveying direction along a conveying path, the conveyor comprising a number of sorting units, each sorting unit comprising a carriage and at least one load-carrying element connected to the carriage for supporting articles, wherein the load-carrying elements are movable with regard to an associated carriage for unloading articles from the load-carrying elements at predetermined unloading positions, at least two of the sorting units being coupled together, a gap being formed between two adjacent load-carrying elements of two sorting units that are coupled together, the gap being covered by an intermediate element adapted to support an article, the sorting device comprising a stationarily arranged removal device for moving a selected article in a transverse direction off the conveyor at a predetermined removal position.

Today's sortation applications require sorter speeds of several m/sec which makes automated removal of articles positioned partially or entirely on an intermediate element a challenge during operation of the sorter. The goal of this invention is the removal of articles positioned between or partially between the load-carrying elements of a sorter in an automated way without stopping or reducing the speed of the sorting device. The load-carrying element can be any sortation tray, cross-belt element, tilt-tray etc., and the sorting device can be any sortation system, e.g. a closed loop sorter or a line sorter. The gaps between the load-carrying elements or trays of a sorter are normally covered by an intermediate element, e.g. a plate. Articles that are positioned on the load-carrying elements are unloaded transversely to the conveying direction of the sorter at predetermined unloading positions, for example by driving the cross-belts transverse to the conveying direction of the conveyor or by activating a tilt tray.

Articles that are positioned by mistake partially or entirely on an intermediate element cannot be unloaded at an unloading position by driving or activating a load-carrying element.

A device for the removal of articles that are positioned on intermediate elements is described in NL 2 015 502 B1. However, this device can only be used during a so-called maintenance run of the sorter and not during regular operation of the sorter. Also, it is known to remove articles manually from an intermediate element during a maintenance brake of the sorter. Both known solutions are costly and/or time-consuming.

SUMMARY

The invention suggests that the removal device comprises a support element, the support element being movable along a longitudinal direction extending parallel to the conveying path, a first drive means being adapted to move the support element with a speed and in a transversal position corresponding to the selected article, the removal device further comprising a pushing element supported by the support element, a second drive means being adapted to move the pushing element in the transverse direction in order to remove the article from the conveyor.

The conveyor may comprise guide means such as a rail or two parallel rails forming the conveying path.

Thus, the removal device can perform movements in two directions. The removal device is positioned next to the sorting device and can run parallel to the conveying direction of the sorting device.

The speed of the removal device parallel to the sorting device can be synchronized with the conveyor. It is possible to position several removal devices at several positions along the conveying path, which can be one or more predetermined unloading position(s) and/or one or more predetermined removing position(s), or only at one position. Thus, a removal position can be identical with an unloading position since the removal device can be used to unload an article at an unloading position and/or to remove an article at a removal position.

The conveyor can comprise one or more trains of sorting units, each train comprising at least two sorting units that are coupled together, wherein preferably the associated carriages are coupled together.

The movement of the removal device to remove an article is transverse to the conveying direction of the sorting device. A forward and backward movement of the removal device in the transverse direction pushes an article off the load-carrying element. These two movements make it possible that the removing device or pushing element matches up the sorter speed and travels along with the article to be removed until it has been removed of the conveyor.

Preferably, the sorting device comprises detecting means adapted to detect an article carried by the conveyor upstream of the removal device. Preferably, the detecting means is adapted to identify an article that is positioned at least partially or entirely on an intermediate element as an article to be removed by the removal device.

Preferably, the detecting means is adapted to identify an article carried by the conveyor as an article to be unloaded at a predetermined unloading position.

The first drive means can comprise a linear actuator. The second drive means can comprise a linear actuator. The linear actuator(s) can be operable by an electric motor, a stepper motor, or by compressed air, in particular a rodless pneumatic cylinder.

The sorting device preferably comprises control means connected to the sorting units and adapted to actuate a load-carrying element carrying an article in order to unload the article at a selected one of the predetermined unloading positions.

Preferably, the control means is connected to the detecting means and to the first and second drive means of the removal device.

Further preferably, the control means is adapted to effect removal of an article at a predetermined removal position or unloading of an article at a predetermined unloading position.

The pushing element can comprise a contact means, in particular a pushing plate for removing an article off the conveyor.

Alternatively, or in addition, the pushing element may comprise at least one air nozzle for removing an article off the conveyor.

Preferably, at least one of the predetermined unloading positions comprises a tube or a takeaway conveyor.

Further, the removal device can comprise a safety mechanism.

The safety mechanism preferably comprises a failure detection device to detect a failure of the conveyor or of the removing device and is adapted to rotate the pushing element out of the area of the conveyor, in particular into an orientation parallel to the conveying direction.

Preferably, the air nozzle comprises a number of individual air nozzles pointing in directions diverging from, parallel to or converging to the transverse direction. The air nozzle can be controlled by the control means.

The detection means can be arranged to detect a weight and/or dimensions of an article, a total pushing force produced by the air nozzle being controlled as a function of the weight and/or of dimensions of an article detected by the detection means. In particular, air pressure and/or a volume flow of air passing through the air nozzle can be controlled.

The pushing element preferably is movable across a part of a width or a full width of the load-carrying elements of the conveyor.

The invention further refers to a method of removing articles from a sorting device of the invention, comprising the following steps:
  moving the conveyor in the conveying direction, at least one article being positioned on a load-carrying element of a sorting unit or at least partially on an intermediate element between two adjacent sorting units,
  identifying, by the detecting means, the article either as an article to be unloaded at a predetermined unloading position or as an article to be removed at a predetermined removing position,
  in case of an article to be removed, moving the support element with a speed and in a position corresponding to the article, and
  moving the pushing element in a transverse direction and removing the article from the conveyor at the predetermined removing position.

Preferably, the method comprises actuating the air nozzle, a total pushing force produced by the air nozzle being controlled as a function of the weight and/or of dimensions of the article to be removed, as detected by a detection means.

In case the article is identified as an article to be unloaded at a predetermined unloading position, the load-carrying element supporting the article is activated so as to unload the article. Alternatively, a removal device can be provided at the predetermined unloading position, and the control can activate the removal device in order to remove or unload the article at the unloading position.

Other embodiments are contemplated in the Detailed Description below, the appended Figures, and in the claims, as originally written or amended, the claims as such being incorporated by reference into this Summary. The foregoing is not intended to be an exhaustive list of embodiments and features of the inventive subject matter. Persons skilled in the art can appreciate other embodiments and features from the following detailed description in conjunction with the drawings.

BRIEF DESCRIPTION OF THE DRAWINGS

The invention will be explained in more detail hereinafter by means of a description of preferred embodiments of a device and a method according to the invention, in which a reference is made to the following figures.

DETAILED DESCRIPTION

Figure 1:
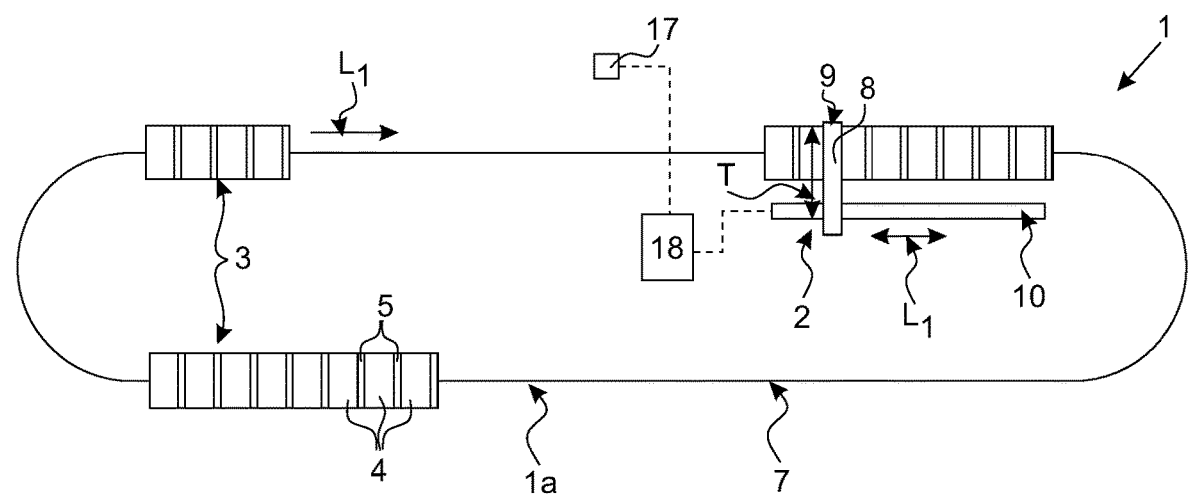
FIG. 1 is a schematic top view of a sorting device according to the invention.

As shown in FIG. 1, a sorting device 1 comprises a conveyor 1a formed by sorting units 4 that can move along an endless transportation path 7. In this case the conveyor comprises three conveying trains 3, each train 3 comprising a number of individual sorting units 4 that are coupled together. The sorting units 4 move in a conveying direction $L_1$. Each sorting unit 4 comprises a carriage and a load-carrying element 4 supported thereon. In this example, the load-carrying elements 4 are formed by crossbelts. The crossbelts can be driven to move in a transverse direction T orthogonal to the conveying direction $L_1$ to either load or unload an article to or from the conveyor. Between each two adjacent load-carrying elements 4 of a train 3 and covering a gap therebetween an intermediate element 5 is arranged. An article that inadvertently is positioned on an intermediate element 5 cannot be unloaded by activating the load-carrying element but has to be removed from the conveyor 3 by a different means. The same problem arises if an article is positioned partly on a load carrying element and partly on an intermediate element. A removal device 2 is arranged along the conveying path 7 for removing such an article.

The removal device 2 comprises a guiding element 10 that extends along a longitudinal direction $L_2$ which is parallel to the conveying direction $L_1$, and mounts a supporting element. The supporting element is movable along the guiding element 10 and is connected to a pushing element 8 having an air nozzle 9 mounted at an end opposite to the supporting element. The pushing element 8 is movable relative to the supporting element along the transverse direction T. In the example shown in FIG. 1, the guiding element 10 is positioned in an interior space enclosed by the conveying path 7 of the endlessly extending conveyor. Thus, the pushing element 8 has to move from an inside of the conveyor to an outside when it is desired to remove an article off the conveyor. An opposite arrangement of the removal device at an outside of the conveyor is possible as well.

The removal device 2 can move the article to be removed either by an air impulse or by a direct mechanical contact. To do so, the pushing element 8 is accelerated along the longitudinal direction $L_2$ on the guiding element 10 until the air nozzle 9 reaches the speed of the train 3 and the position of the article. When speed and position correspond, the pushing element 8 is moved in the transverse direction T. After the article has been cleared, the pushing element 8 and the air nozzle 9 are moved backwards along the transverse direction T until the air nozzle is no longer over the area of the conveyor. After this the pushing element 8 and the air nozzle 9 are decelerated and moved back to a starting position. Usually, the starting position is at an upstream end of the guiding element 10, with regard to the conveying direction $L_1$.

Figure 2:
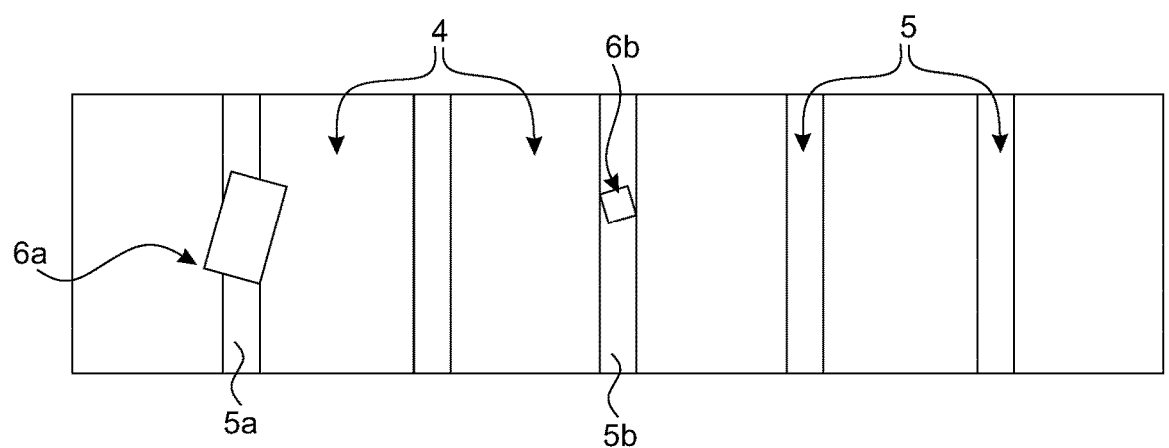
FIG. 2 is a schematic top view of a train of sorting units coupled together.

In FIG. 2 a train 3 of a conveyor, as described above, is shown in more detail. The train comprises six sorting units 4 each having a load carrying element 4, an intermediate element 5 being positioned between each two juxtaposed sorting units and bridging a gap therebetween. The load carrying elements 4 are crossbelts, but can be of any type. Two articles 6a, 6b are shown positioned on intermediate elements 5a, 5b, respectively. One of the conveyed articles, article 6a, is positioned partially on intermediate element 5a and partially on the crossbelts of two juxtaposed sorting units 4. Preferably, the two crossbelts are immobilised until article 6a is removed. Another article, article 6b, is located on an intermediate element 5b without being in contact with any of the load carrying elements 4. Thus, none of the crossbelts 4 next to article 6b is able to remove or unload the article 6b, so that the removal device must be activated to remove the article.

Figure 3:
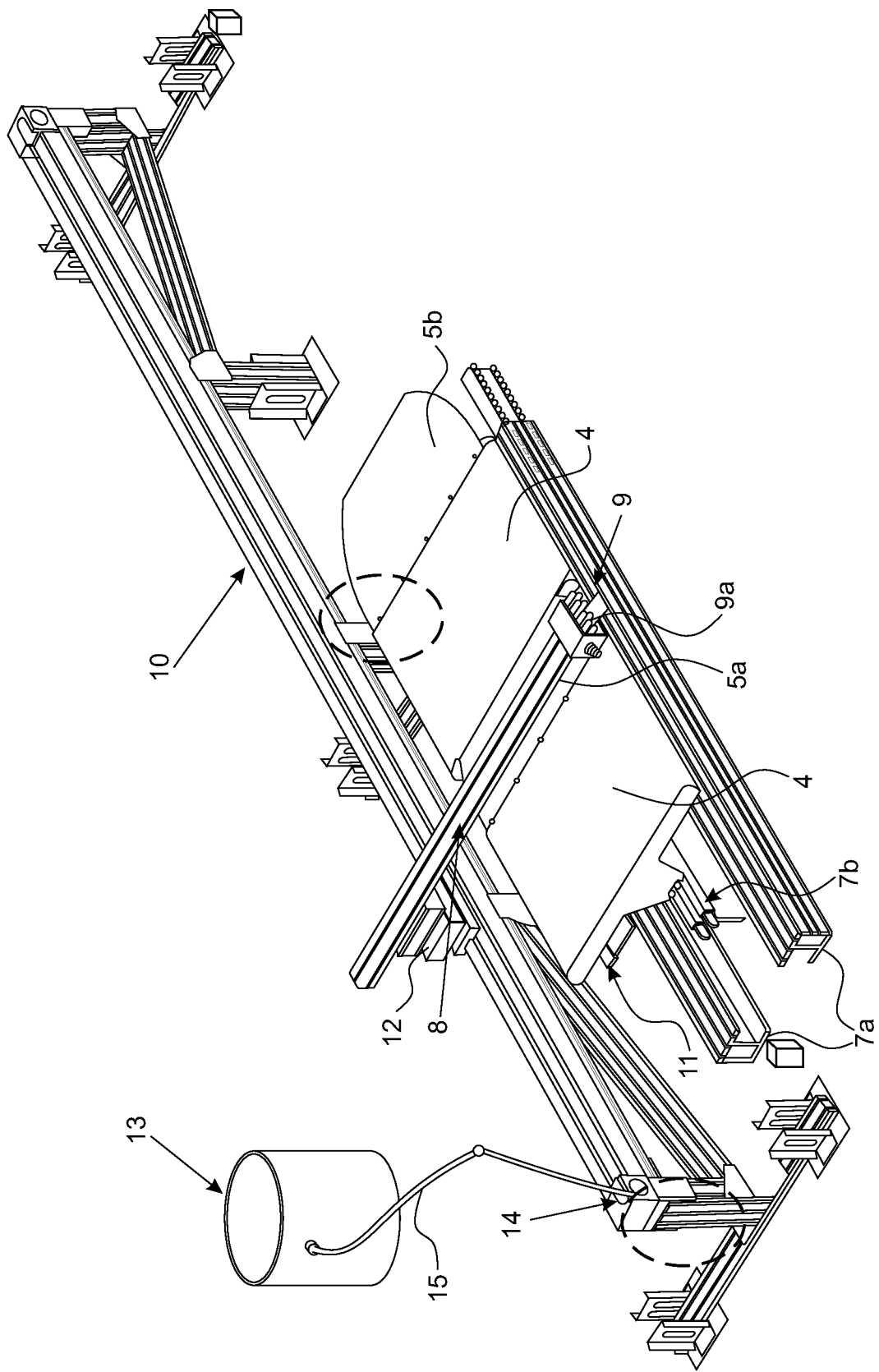
FIG. 3 is a schematic perspective view of a removal device.

FIG. 3 shows a perspective view of a removal device 2 and two sorting units 11 coupled together. Each sorting unit 11 comprises a crossbelt 4. An intermediate element 5a is positioned to bridge a gap between the crossbelts. Another intermediate element 5b is shown to illustrate that an article which inadvertently moves off a sorting unit 11 in the longitudinal direction will not fall off the sorting device altogether but will land on an intermediate element. The sorting units are guided by two guiding rails 7a, forming the conveyor path 7. A driving means 7b runs centrally between the two guiding rails 7a to move the sorting units, e.g. a chain, belt or an induction drive. Parallel to the rails 7a a guiding element 10 of a removal device is positioned. The guiding element 10 comprises a rodless pneumatic cylinder provided to move a support element 12 along the guiding element 10. The support element 12 comprises a slide engaging with in the guiding element 10 in order to guide the support element along the longitudinal direction $L_2$. A pneumatic control element 14 is positioned at one end of the guiding element 10 and is connected by a connection 15 to a compressed air supply 13. A pushing element 8 is moveably mounted on the support element 12 while being moved together with the support element 12 in the longitudinal direction $L_2$. The pushing element 8 can be moved relative to the support element 12 in a direction orthogonal to the guiding element 10, i.e. in the transverse direction T, by a pneumatic force created by the rodless pneumatic cylinder.

Figure 5:
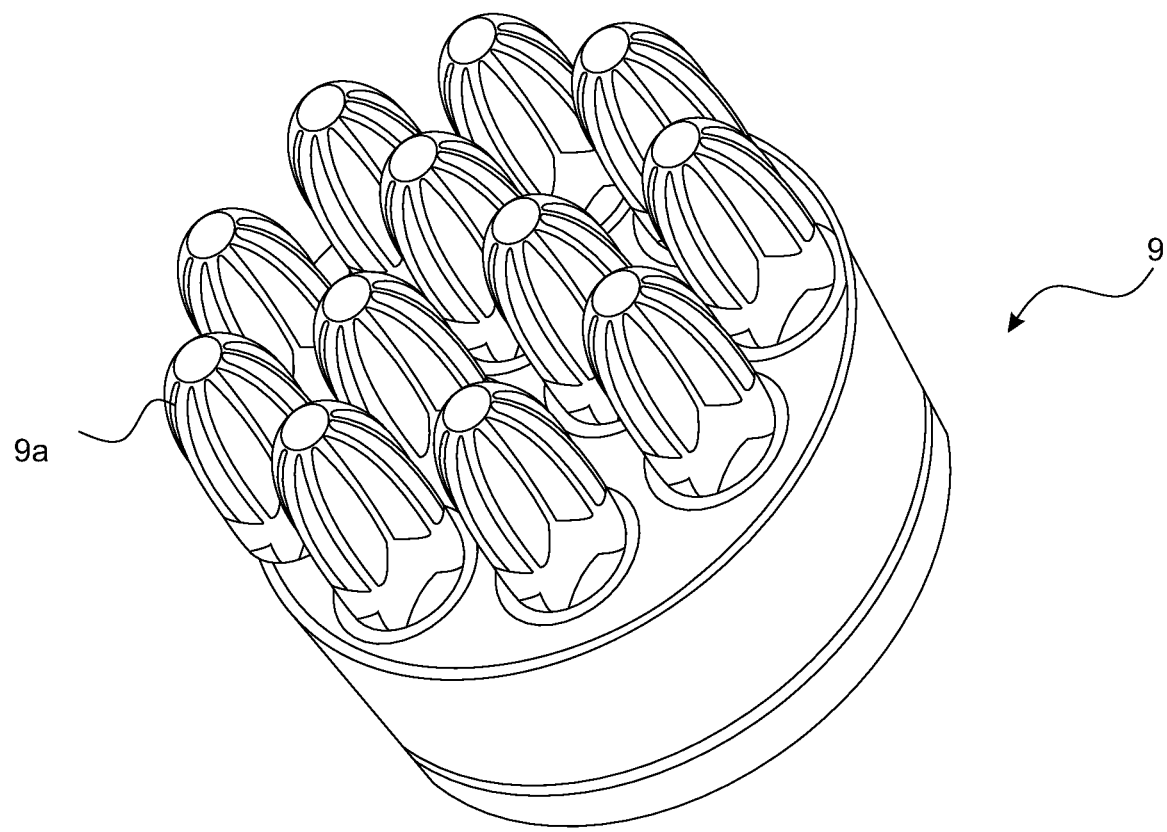
FIG. 5 is a detailed drawing of an air nozzle.

Inside the pushing element 8 a channel is located for supplying compressed air to the air nozzle 9 mounted at the end of the pushing element 8. The air nozzle 9 comprises several individual air nozzles 9a (FIG. 5). In case an article has to be removed from the conveyor, the air nozzle 9 is moved towards the conveyed article as described above, and then an impulse of air is applied to the article through the individual air nozzles 9a so that the article is pushed off the conveyor. Depending on the weight and the volume or size of the article to be removed, pressure and flow rate of the compressed air supplied to the air nozzle 9 can be adjusted.

A sensor or detecting means 17 connected to a control 18 is provided to detect an article to be removed, and/or the weight of the article and/or the size of the article. The detecting means 17 may comprise a camera, a light barrier, a light screen and/or a balance.

Figure 4:
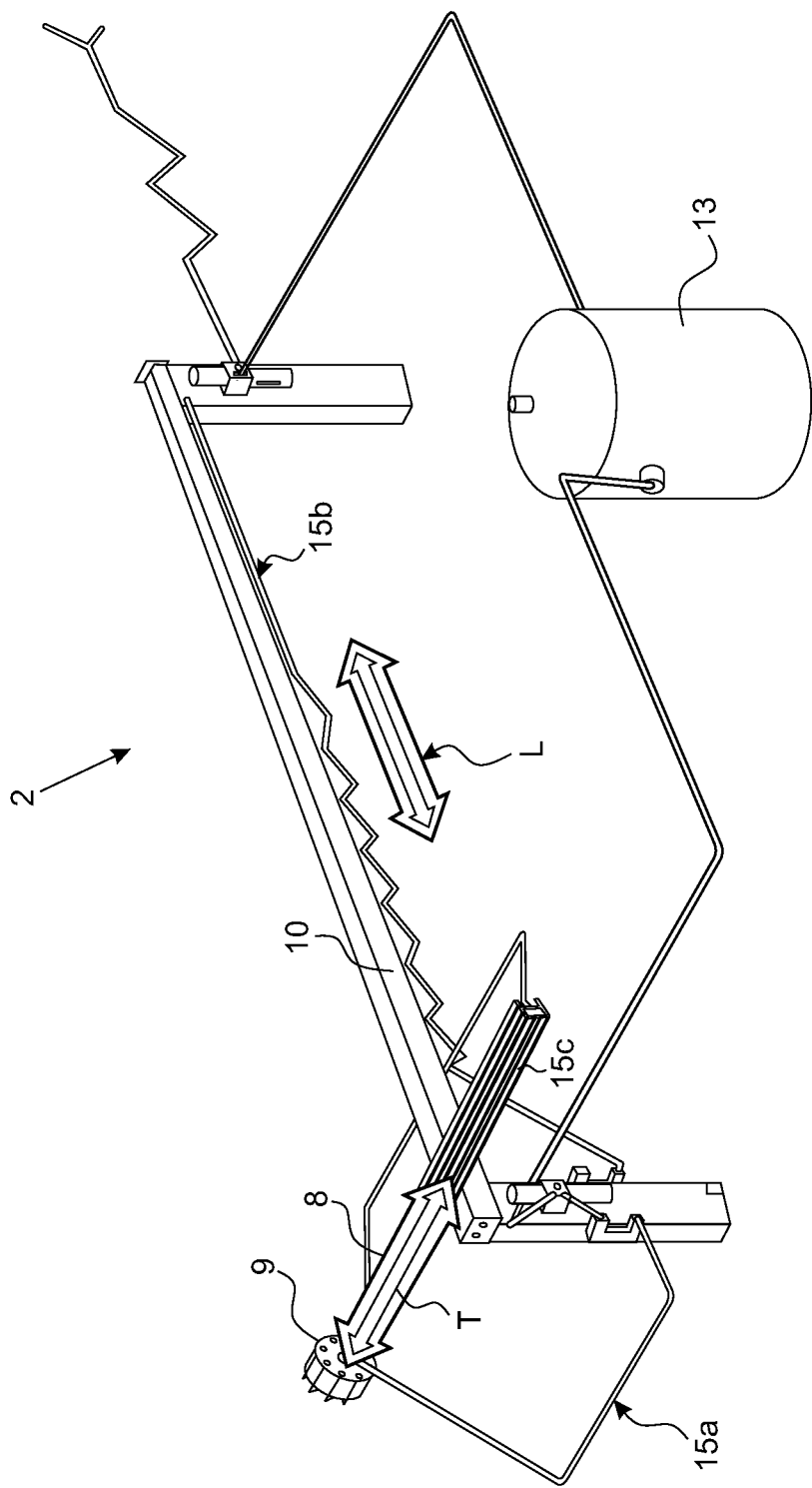
FIG. 4 is a schematic perspective view of another embodiment of a removal device.

FIG. 4 shows an embodiment, where all drive means of the removal device are powered by compressed air. Each drive means 15a, 15b, 15c is connected to the control 18 and has its own regulation valve to control speed and position. A first drive means 15a supplies the air nozzle 9 with compressed air. A second drive means 15b moves and positions the support element along the longitudinal direction $L_2$. A third drive means 15c moves and positions the pushing element 8 along the transverse direction T, so that the air nozzle 9 is moved towards an article or in contact with an article to be cleared from the conveyor. In the shown embodiment all drive means 15a, 15b, 15c have a common compressed air supply with a common compressed air pressure. The pressure in the separate drive means 15a, 15b, 15c is controlled by individual regulating valves of each drive.

FIG. 5 shows a particular embodiment of an air nozzle 9. The air nozzle 9 comprises twelve individual air nozzles 9a. Each of the individual air nozzles 9a produces an air jet preferably directed in the transverse direction T. Alternatively, the air jets of the individual nozzles may diverge relative to the direction T, longitudinal axes of the jets being arranged on a diverging cone centered at a center axis of the air nozzle 9 that points in the direction T. As another alternative, the air jets may converge, longitudinal axes being arranged on a converging cone pointing in direction T. A half angle of the cone may be in a range from 1° to 20°, preferably from 5° to 10°. A center axis of the cone can be horizontal or in an alternative be inclined upward or downward.

Persons skilled in the art will recognize that many modifications and variations are possible in the details, materials, and arrangements of the parts and actions which have been described and illustrated to explain the nature of the inventive subject matter, and that such modifications and variations do not depart from the spirit and scope of the teachings and claims contained therein.

The principles described above about any particular example can be combined with the principles described in connection with any one or more of the other examples. Accordingly, this detailed description shall not be construed in a limiting sense, and following a review of this disclosure, those of ordinary skill in the art will appreciate the wide variety of systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be plain to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed as "a means plus function" claim under US patent law, unless the element is expressly recited using the phrase "means for" or "step for".

Each named inventor and the applicant reserve all rights to the subject matter disclosed herein, including the right to claim all that comes within the scope and spirit of the claims appended below.

The invention claimed is:

1. A sorting device for sorting articles, comprising:
 a train which is movable in a conveying direction along a guide means defining a conveying path, the train comprising a number of sorting units,
 each sorting unit comprising a carriage and at least one load-carrying element connected to the carriage for supporting articles,
 wherein the load-carrying elements are configured to transversely move an article relative to the conveying direction for unloading articles from the load-carrying elements at predetermined unloading positions, wherein in the train at least two of the sorting units being coupled together, a gap being formed between the two adjacent load-carrying elements of the two coupled sorting units, the gap being covered by an intermediate element adapted to partially or fully support the selected article, the sorting device further comprising a stationarily arranged removal device for moving the selected article in a transverse direction off the train at a predetermined removal position, and wherein the removal device comprises a support element, the support element being movable along a longitudinal direction extending parallel to the conveying path, a first drive means being adapted to move the support element with a speed and in a transversal position corresponding to the selected article, the removal device further comprising a pushing element supported by the support element, a second drive means being adapted to move the pushing element in the transverse direction in order to remove the selected article that is fully or partially disposed on the intermediate element that is disposed between the coupled sorting units from the intermediate element.

2. The sorting device of claim 1, wherein a speed of the removal device parallel to the sorting device can be synchronized with the conveyor.

3. The sorting device of claim 1, wherein several removal devices are positioned at predetermined removal positions.

4. The sorting device of claim 1, wherein a removal device is positioned at a predetermined unloading position.

5. The sorting device of claim 1, wherein several removal devices are positioned at several unloading positions.

6. The sorting device of claim 1, further comprising detecting means adapted to detect an article carried by the conveyor upstream of the removal device.

7. The sorting device of claim 6, wherein the detection means is arranged to detect a weight and/or dimensions of an article.

8. The sorting device of claim 7, wherein a total pushing force produced by the air nozzle is controlled as a function of the weight and/or of dimensions of an article detected by the detection means.

9. The sorting device of claim 8, wherein air pressure and/or a volume flow of air passing through the air nozzle is controlled.

10. The sorting device of claim 1, further comprising a detecting means adapted to identify an article that is positioned at least partially or entirely on an intermediate element as an article to be removed by the removal device.

11. The sorting device of claim 1, further comprising a detecting means adapted to identify an article carried by the conveyor as an article to be unloaded at a predetermined unloading position.

12. The sorting device of claim 1, wherein the first drive means comprises a linear actuator.

13. The sorting device of claim 1, wherein the second drive means comprises a linear actuator.

14. The sorting device of claim 1, wherein one or both of the first or second drive means comprises a linear actuator and the linear actuator(s) is (are) operable by an electric motor, a stepper motor, by compressed air or by a rodless pneumatic cylinder.

15. The sorting device of claim 1, further comprising control means connected to the sorting units and adapted to actuate a load-carrying element carrying an article in order to unload the article at a predetermined unloading position.

16. The sorting device of claim 15, wherein the control means is connected to the detecting means and to the first and second drive means of the removal device.

17. The sorting device of claim 15, wherein the control means is adapted to actuate the removal device in order to remove an article at a predetermined removal position or to unload an article at a predetermined unloading position.

18. The sorting device of claim 1, wherein the pushing element comprises a contact means.

19. The sorting device of claim 18, wherein the contact means comprising a pushing plate.

20. The sorting device of claim 1, wherein the pushing element comprises at least one air nozzle for removing an article off the conveyor.

21. The sorting device of claim 20, wherein the air nozzle comprises a number of individual air nozzles pointing in directions diverging from and/or parallel to and/or converging to the transverse direction.

22. The sorting device of claim 1, wherein at least one of the predetermined unloading positions comprises a tube or a takeaway conveyor or box or container or chute.

23. The sorting device of claim 1, wherein the removal device includes a safety mechanism, the safety mechanism comprises a failure detection device to detect a failure of the conveyor or of the removal device and is adapted to rotate the pushing element out of the area of the conveyor.

24. A method of removing articles from a sorting device of claim 1, the method comprising the following steps:
    moving the conveyor in the conveying direction, at least one article being positioned on a load-carrying element of a sorting unit or at least partially on an intermediate element between two adjacent sorting units,
    identifying, by the detecting means, the article either as an article to be unloaded at a predetermined unloading position or as an article to be removed at a predetermined removing position,
    in case of an article to be removed, moving the support element with a speed and in a position corresponding to the article, and
    moving the pushing element in a transverse direction and removing the article from the conveyor at the predetermined removing position.

25. The method of claim 24, further comprising actuating the air nozzle, a total pushing force produced by the air nozzle being controlled as a function of the weight and/or of dimensions of the article to be removed, as detected by a detection means arranged to detect a weight and/or dimensions of an article.

* * * * *